US009619032B1

(12) United States Patent
Ekambaram et al.

(10) Patent No.: US 9,619,032 B1
(45) Date of Patent: Apr. 11, 2017

(54) ACCESSIBILITY PATH GUIDING THROUGH MICROFLUIDICS ON A TOUCH SCREEN

(71) Applicant: International Business Machines Corporation, Armonk, NY (US)

(72) Inventors: Vijay Ekambaram, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/885,218

(22) Filed: Oct. 16, 2015

(51) Int. Cl.
G06F 3/01 (2006.01)
G06F 3/041 (2006.01)
G09B 21/00 (2006.01)

(52) U.S. Cl.
CPC ............ G06F 3/016 (2013.01); G06F 3/0416 (2013.01); G09B 21/007 (2013.01); *G06F 2203/04809* (2013.01)

(58) Field of Classification Search
CPC ........ G06F 3/016; G06F 3/0416; G06F 3/167; G06F 9/4443; G06F 2203/04809; G09B 21/001
See application file for complete search history.

(56) References Cited

U.S. PATENT DOCUMENTS

| 8,154,527 | B2 | 4/2012 | Ciesla et al. |
| 8,179,375 | B2 | 5/2012 | Ciesla et al. |
| 8,179,377 | B2 | 5/2012 | Ciesla et al. |
| 8,196,104 | B2 | 6/2012 | Cohrs et al. |
| 8,199,124 | B2 | 6/2012 | Ciesla et al. |
| 8,207,950 | B2 | 6/2012 | Ciesla et al. |
| 8,243,038 | B2 | 8/2012 | Ciesla et al. |
| 8,456,438 | B2 | 6/2013 | Ciesla et al. |
| 8,547,339 | B2 | 10/2013 | Ciesla |
| 8,553,005 | B2 | 10/2013 | Ciesla et al. |
| 8,570,295 | B2 | 10/2013 | Ciesla et al. |
| 8,587,541 | B2 | 11/2013 | Ciesla et al. |
| 8,587,548 | B2 | 11/2013 | Ciesla et al. |

(Continued)

OTHER PUBLICATIONS

Petrie et al. "People with Disabilities: Automatic and Manual Evaluation of Web Sites: Introduction to the Special Thematic Session", ICCHP 2006, LNCS 4061, pp. 152-155, 2006.

(Continued)

*Primary Examiner* — Larry Sternbane
(74) *Attorney, Agent, or Firm* — Brown & Michaels, PC; Maeve L. McCarthy

(57) ABSTRACT

Providing accessibility path guidance on a display presented on a touch screen of a device with microfluidics. The fluid is selectively applied to a portion of the touch screen by a computer of the device to raise a portion of the touch screen. The computer loads a display on the touch screen which requires user input. The flow information regarding the display is fetched and a computer of the device detects that the user has touched the touch screen at a point. The computer uses microfluidics to create a physical ridge on the touch screen corresponding to a flow path connecting the point on the touch screen in which the user is currently touching to a touch point within an object field which requires user input. Once the user has reached the object field by following the physical ridge through touch, the physical ridge is removed.

20 Claims, 7 Drawing Sheets

(56) References Cited

U.S. PATENT DOCUMENTS

| | | | |
|---|---|---|---|
| 8,619,035 B2 | 12/2013 | Ciesla et al. | |
| 8,704,790 B2 | 4/2014 | Ciesla et al. | |
| 8,717,326 B2 | 5/2014 | Ciesla | |
| 8,723,832 B2 | 5/2014 | Ciesla et al. | |
| 8,736,566 B2* | 5/2014 | Carvajal | G06F 3/03547 345/173 |
| 8,922,502 B2 | 12/2014 | Ciesla et al. | |
| 8,922,503 B2 | 12/2014 | Ciesla et al. | |
| 8,922,510 B2 | 12/2014 | Ciesla et al. | |
| 8,928,621 B2 | 1/2015 | Ciesla et al. | |
| 8,947,383 B2 | 2/2015 | Ciesla et al. | |
| 8,970,403 B2 | 3/2015 | Ciesla et al. | |
| 9,013,417 B2 | 4/2015 | Ciesla et al. | |
| 9,019,228 B2 | 4/2015 | Yairi et al. | |
| 9,035,898 B2 | 5/2015 | Ciesla | |
| 9,052,790 B2 | 6/2015 | Yairi et al. | |
| 9,063,627 B2 | 6/2015 | Yairi et al. | |
| 9,075,525 B2 | 7/2015 | Ciesla et al. | |
| 9,098,141 B2 | 8/2015 | Ciesla et al. | |
| 9,116,617 B2 | 8/2015 | Ciesla et al. | |
| 9,128,525 B2 | 9/2015 | Yairi et al. | |
| 2006/0195819 A1 | 8/2006 | Chory et al. | |
| 2007/0008301 A1* | 1/2007 | Stewart | G09B 21/006 345/173 |
| 2009/0267921 A1* | 10/2009 | Pryor | B60K 35/00 345/177 |
| 2009/0300709 A1 | 12/2009 | Chen et al. | |
| 2010/0127975 A1* | 5/2010 | Jensen | G06F 3/03547 345/157 |
| 2011/0018813 A1* | 1/2011 | Kruglick | G06F 3/016 345/173 |
| 2011/0163978 A1* | 7/2011 | Park | G06F 3/016 345/173 |
| 2012/0032886 A1 | 2/2012 | Ciesla et al. | |
| 2012/0235935 A1* | 9/2012 | Ciesla | G06F 3/0202 345/173 |
| 2012/0260177 A1* | 10/2012 | Sehrer | G06F 17/24 715/727 |
| 2013/0044100 A1 | 2/2013 | King | |
| 2015/0178252 A1* | 6/2015 | Dunn | G06F 17/2247 715/234 |

OTHER PUBLICATIONS

Koutsabasis, K. "Beyond Specifications: Towards a Practical Methodology for Evaluating Web Accessibility", Journal of Usability Studies; vol. 5, Issue 4, Aug. 2010, pp. 157-171.

"Android GUI Ripper Wiki", retrieved from http://wpage.unina.it/ptramont/GUIRipperWiki.html, Feb. 2013.

\* cited by examiner

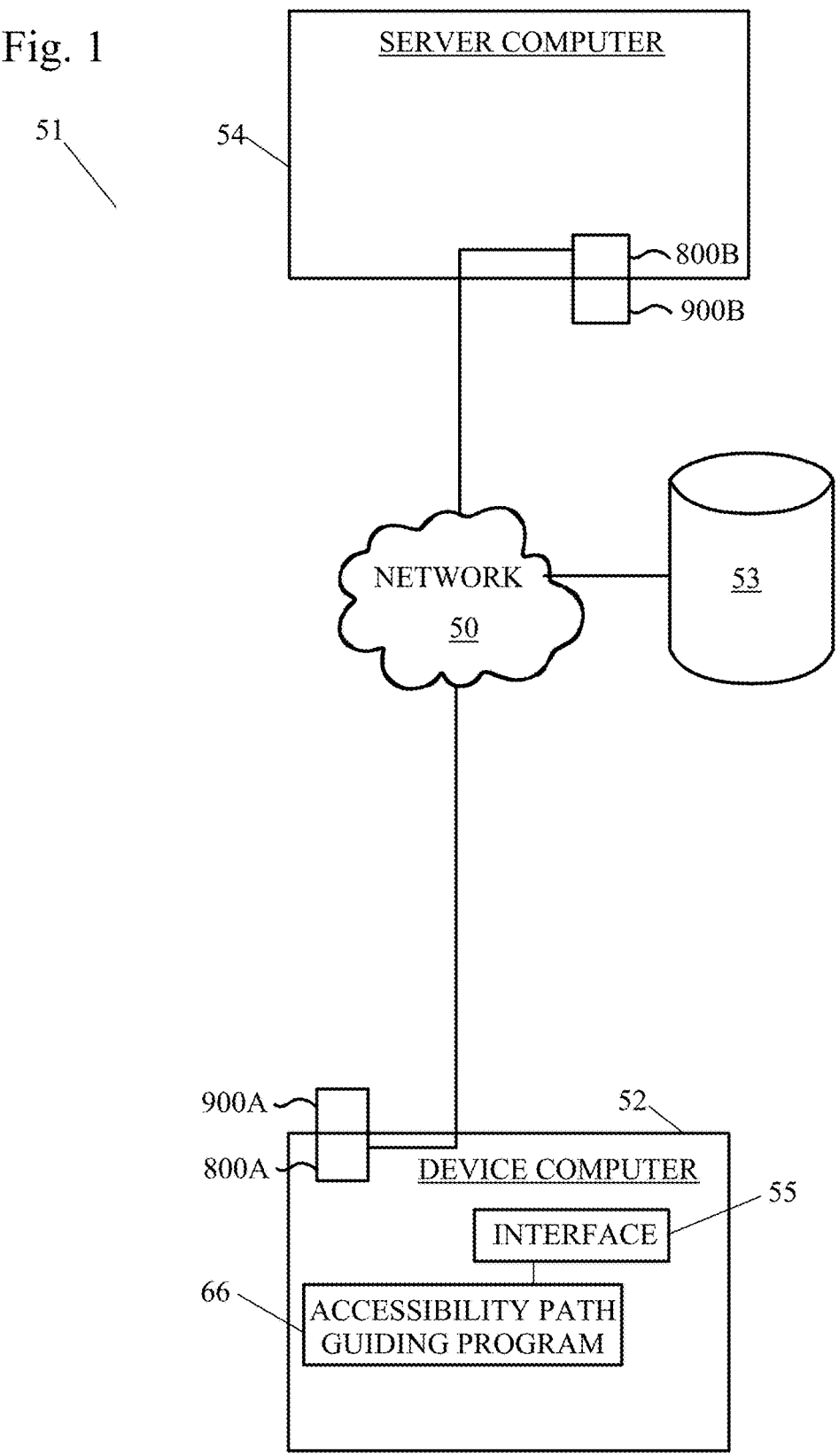

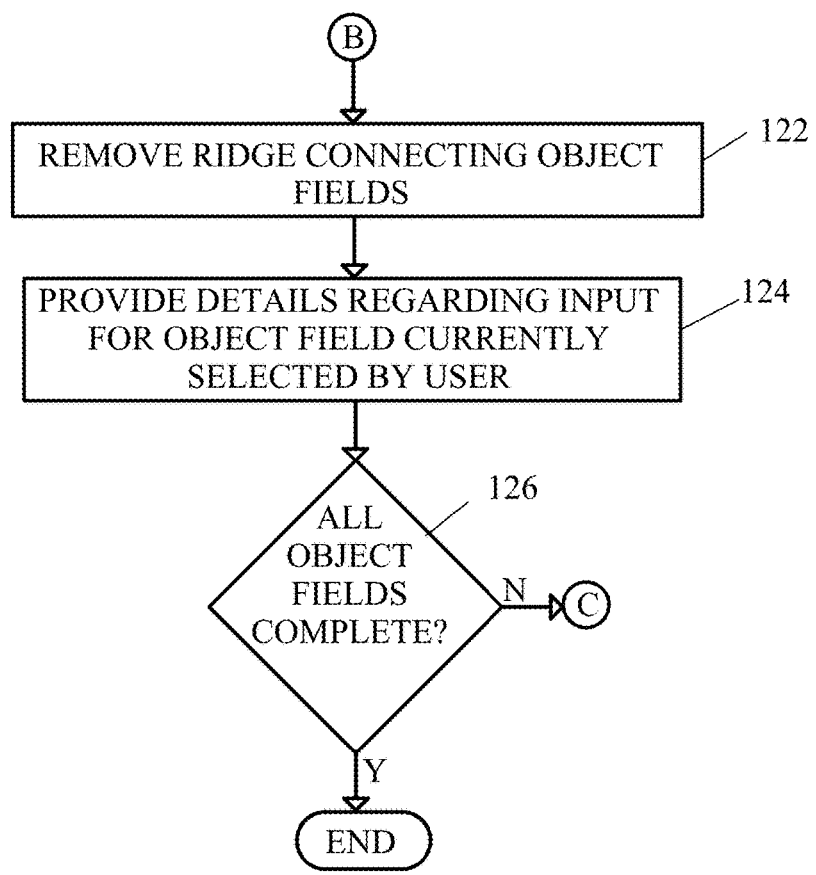

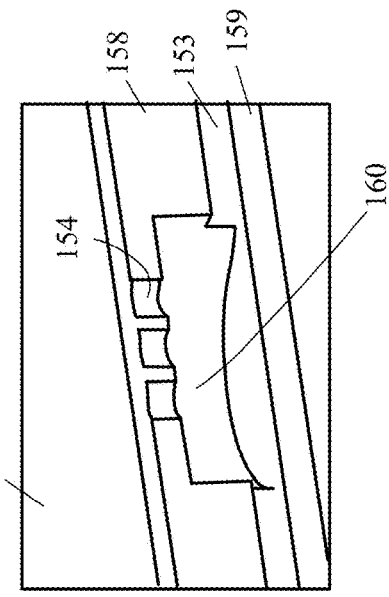
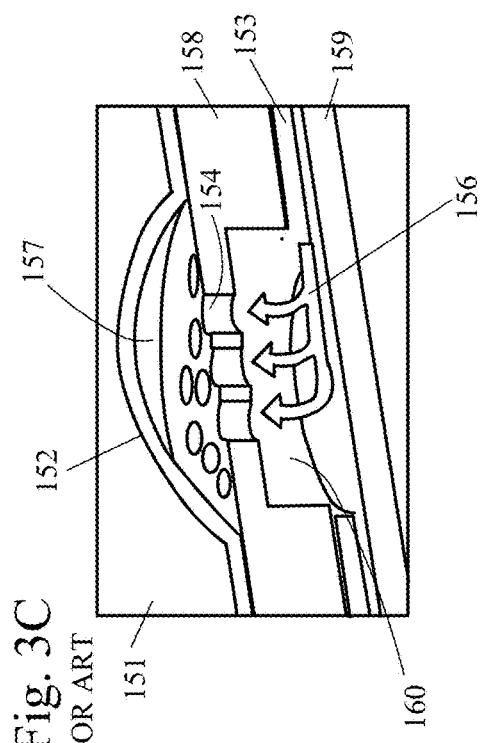
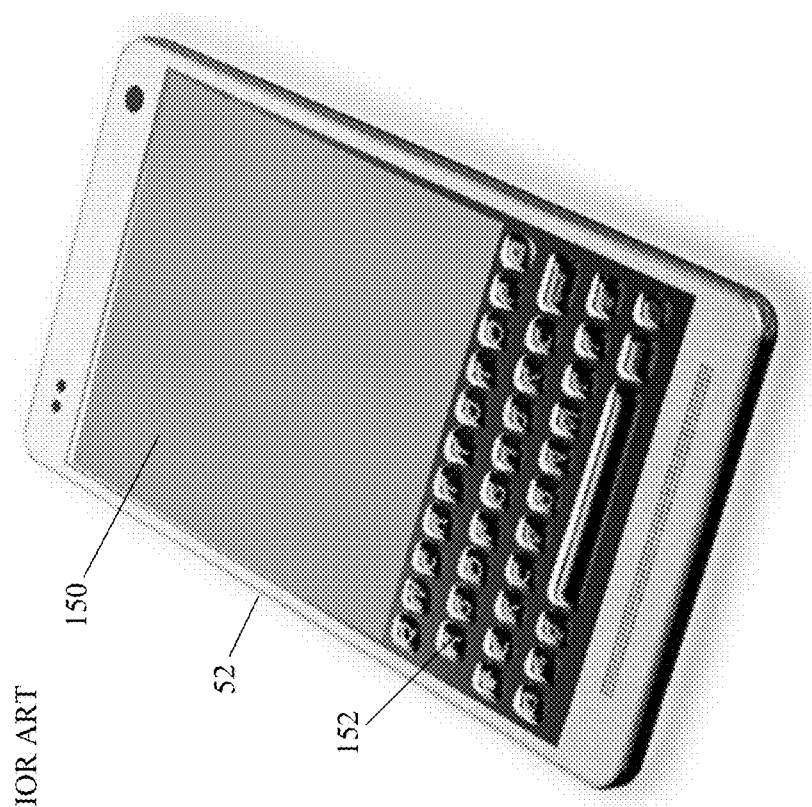
Fig. 3B PRIOR ART
Fig. 3C PRIOR ART
Fig. 3A PRIOR ART

ACCESSIBILITY PATH GUIDING THROUGH MICROFLUIDICS ON A TOUCH SCREEN

BACKGROUND

The present invention relates to providing path guidance to users who are vision impaired or blind, and more specifically to providing accessibility path guiding through microfluidics on a touch screen to provide guidance between object fields requiring input to users who are vision impaired or blind.

Current mobile devices have built in features to help vision impaired or blind users to interface with mobile applications. For example, TalkBack™ provides spoken feedback to help blind or low vision users by describing what the user is touching, selecting or activating. Another approach is "explore by touch", which enables users to hear or see descriptions of what they are touching and is used mostly for vision impaired users. VoiceOver® (a registered trademark of Voicebrook Inc.) is another solution which speaks items on the screen to the user. When a user taps the screen, an item will be selected and spoken, tapping twice will activate the selected item.

In other programs, when an application is coded, accessibility text for each object is assigned programmatically. This accessibility information is provided in an "explore by touch approach" and only reads out information when a user moves their finger over the object. This approach can be time consuming in that the user has to randomly move their fingers over the touch screen in order find the object they wish to select. This can become increasingly difficult if the screen is large.

FIG. 3A shows a depiction of a device with buttons raised through use of microfluidics. FIG. 3B shows a cut through of the layers of the screen of the device with buttons flush with the screen. FIG. 3C shows a cut through of the layers of the screen of the device with buttons raised through microfluidics. An example of a device which uses microfluidics to provide physically raised buttons is the Tactile Layer™ technology by Tactus Technology, Inc., of Fremont, Calif.

Referring to FIG. 3A, the device computer 52 has a touch screen 150. At least a portion of the screen 150 has multiple layers. A first layer 151 is the touch interface in which the user directly interacts with. A second layer 158 is present between the first layer 151 and a third layer 159. The second layer 158 has a plurality of holes 154. The plurality of holes 154 may be placed in specific patterns or formations in different portions of the screen. A reservoir 160 is formed between the second layer 158 and the third layer 159 and is in fluid communication with the plurality of holes 154 and a passage 153 formed between the second layer 158 and a third layer 159 in connection to a microfluidics supply (not shown). The plurality of holes may be distributed in various patterns.

In one embodiment, object fields or widgets of a particular web page or screen of an application are rendered on the touch screen such that the objects are overlaid on the touch screen 150 where the fluid 156 can form ridges and/or buttons. A processor or computer of the device computer 52 preferably renders the widgets or object fields with at least one or more intersection points with microfluidic passages 153 and corresponding holes 154 and therefore a ridge can connect touch points on the touch screen 150 and the ridges can be created between any two objects or object fields on the touch screen 150 of the device.

FIG. 3B shows the touch screen 150 in a position in which fluid 156 is not provided to the reservoir 160. When no fluid 156 is supplied to the reservoir 160, the entire first layer 151 of the touch screen 150 remains in contact with the second layer 158.

FIG. 3C shows the touch screen 150 in a position in which fluid 156 is supplied from a supply (not shown) to the reservoir 160 through a passage 153. The fluid flows from the passage 153 and reservoir 160, through the holes 154 of the second layer 158 to form a pocket 157 of fluid between the first layer 151 and the second layer 158. The pressure of the fluid 156 causes the first layer 151 to separate from the second layer 158 and fill the pocket 157. The pocket 157 forms a button 152 or ridge (see FIGS. 4-6) relative to the rest of the first layer 151. It should be noted that fluid may be supplied selectively to different portions of the touch screen 150.

Patents on the Tactile Touch™ technology include U.S. Pat. No. 8,154,527 "User Interface System", U.S. Pat. No. 8,970,403 "Method for actuating a tactile interface layer", U.S. Pat. No. 8,547,339 "System and methods for raised touch screens" and U.S. Pat. No. 9,128,525 "Dynamic tactile interface", among others.

SUMMARY

According to one embodiment of the present invention, a method of providing accessibility path guidance on a display presented on a touch screen of a device with microfluidics is disclosed. The fluid is selectively applied to a portion of the touch screen by a computer of the device to raise a portion of the touch screen. The method comprising the steps of: the computer loading a display on the touch screen which requires user input; the computer fetching flow information regarding the display; the computer detecting that the user has touched the touch screen at a point; the computer using microfluidics to create a physical ridge on the touch screen corresponding to a flow path connecting the point on the touch screen in which the user is currently touching to a touch point within an object field which requires user input; once the user has reached the object field which requires user input by following the flow path through touch, the computer removing the physical ridge and providing details to the user regarding the input required in the object field; and the computer creating a physical ridge on the touch screen through microfluidics connecting a touch point within the object field which required user input to a touch point on the touch screen within another object field which requires user input.

According to another embodiment of the present invention, a computer program product for providing accessibility path guidance on a display presented on a touch screen of a device with microfluidics is disclosed. The fluid is selectively applied to a portion of the touch screen by a computer of the device to raise a portion of the touch screen. The computer comprises at least one processor, one or more memories, one or more computer readable storage media. The computer program product comprising a computer readable storage medium having program instructions embodied therewith, the program instructions executable by the computer to perform a method comprising: loading, by the computer, a display on the touch screen which requires user input; fetching, by the computer, flow information regarding the display; detecting, by the computer, that the user has touched the touch screen at a point; using, by the computer, microfluidics to create a physical ridge on the touch screen corresponding to a flow path connecting the point on the touch screen in which the user is currently touching to a touch point within an object field which requires user input; once the user has reached the object field which requires user input by following the flow path through touch, removing, by the computer the physical ridge and providing details to the user regarding the input required in the object field; and creating, by the computer, a physical ridge on the touch screen through microfluidics connecting a touch point within the object field which required user input to a touch point on the touch screen within another object field which requires user input.

According to another embodiment of the present invention, a computer system for providing accessibility path guidance on a display presented on a touch screen of a device with microfluidics. The fluid is selectively applied to a portion of the touch screen by a computer of the device to raise a portion of the touch screen. The computer comprising at least one processor, one or more memories, one or more computer readable storage media having program instructions executable by the computer to perform the program instructions comprising loading, by the computer, a display on the touch screen which requires user input; fetching, by the computer, flow information regarding the display; detecting, by the computer, that the user has touched the touch screen at a point; using, by the computer, microfluidics to create a physical ridge on the touch screen corresponding to a flow path connecting the point on the touch screen in which the user is currently touching to a touch point within an object field which requires user input; once the user has reached the object field which requires user input by following the flow path through touch, removing, by the computer the physical ridge and providing details to the user regarding the input required in the object field; and creating, by the computer, a physical ridge on the touch screen through microfluidics connecting a touch point within the object field which required user input to a touch point on the touch screen within another object field which requires user input.

BRIEF DESCRIPTION OF THE SEVERAL VIEWS OF THE DRAWINGS

FIG. 1 depicts an exemplary diagram of a possible data processing environment in which illustrative embodiments may be implemented.

FIGS. 2A-2B show a flow diagram of a method of providing accessibility path guidance on a touch screen of a device.

FIG. 3A shows a depiction of a prior art device with raised buttons through microfluidics.

FIG. 3B shows a cut through of the layers of the screen of the prior art device with buttons flush with the screen.

FIG. 3C shows a cut through of the layers of the screen of the prior art device with buttons raised through microfluidics.

DETAILED DESCRIPTION

Figure 2A:
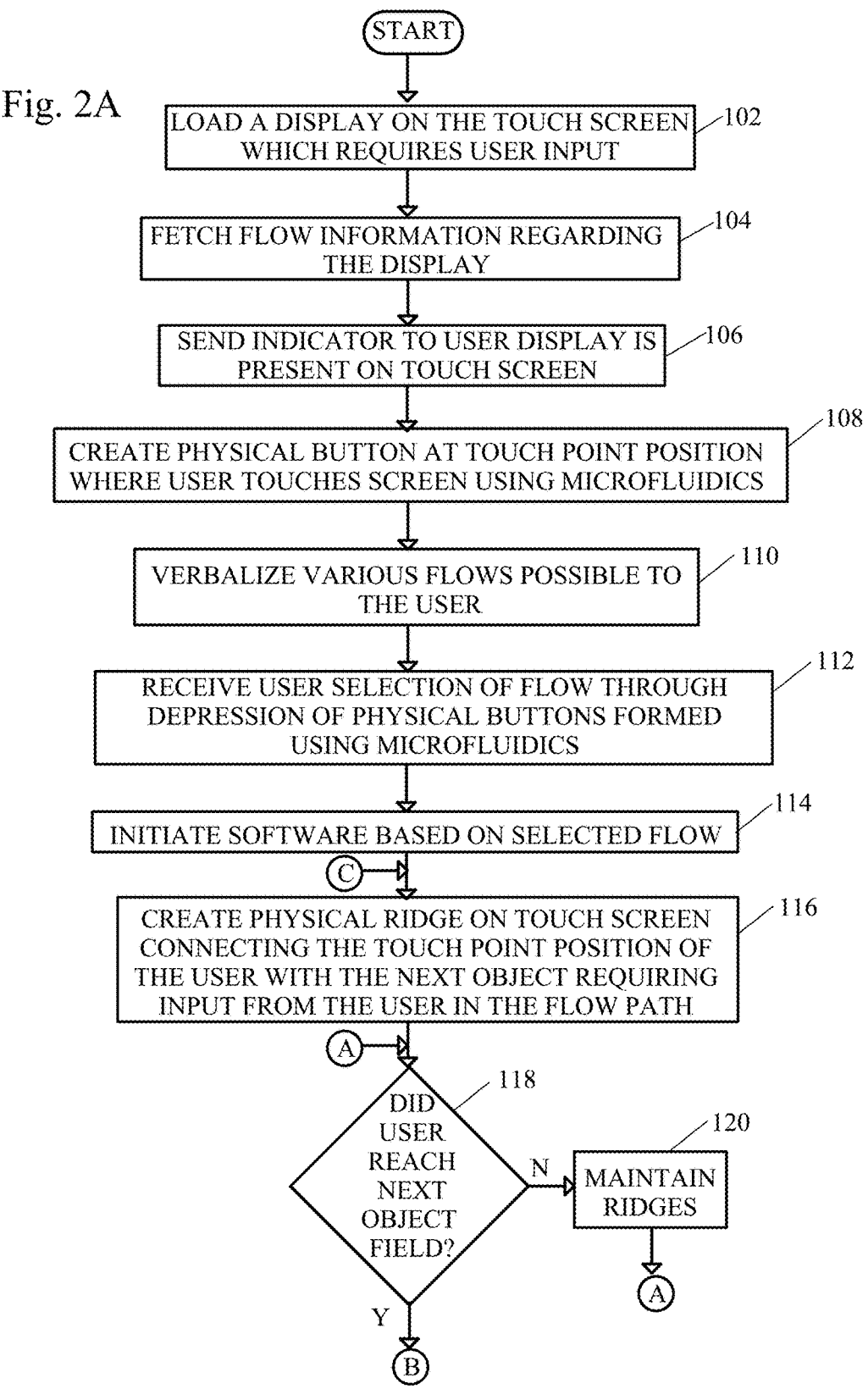

It should be noted that while the principal user referred to in the present application is likely to be either vision impaired or blind, any user may use the method. The method could also be useful in applications where a user cannot or does not wish to display a light, for example under combat conditions or in a theater, etc.

It should also be noted that the term "display" as used herein refers to information visually displayed to a user. The information could be from software, programs, web pages, or other sources.

FIG. 1 is an exemplary diagram of a possible data processing environment in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, a device computer 52, a repository 53, and a server computer 54 connect to network 50. In other exemplary embodiments, network data processing system 51 may include additional client or device computers, storage devices or repositories, server computers, and other devices not shown.

Figure 7:
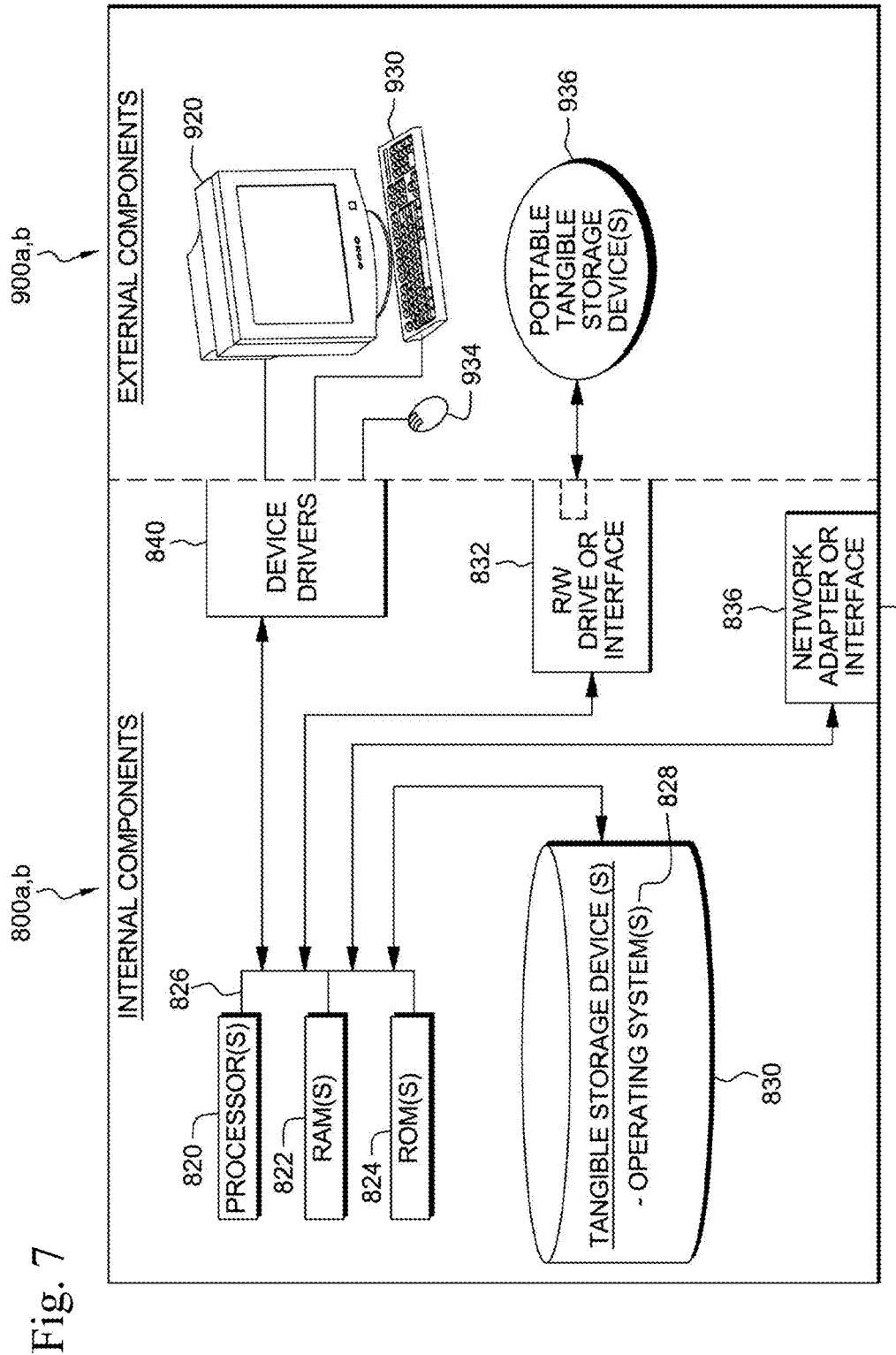
FIG. 7 illustrates internal and external components of a client or device computer and a server computer in which illustrative embodiments may be implemented.

Device computer 52 includes a set of internal components 800a and a set of external components 900a, further illustrated in FIG. 7. Device computer 52 may be, for example, a mobile device, a cell phone, a smart phone, a personal digital assistant, a netbook, a laptop computer, a tablet computer, a desktop computer, or any other type of computing device.

The device computer 52 preferably includes microfluidics which are discernable through touch to enable an interface of the device, preferably a touch screen, to raise and lower portions of the screen. The interface may accept commands and data entry from a user. The interface is preferably a touch user interface (TUI). The device computer 52 preferably includes an accessibility path guidance program 66.

Server computer 54 includes a set of internal components 800b and a set of external components 900b illustrated in FIG. 7. In the depicted example, server computer 54 provides information, such as boot files, operating system images, and applications to device computer 52. Server computer 54 can compute the information locally or extract the information from other computers on network 50.

Program code and programs such as an accessibility path guidance program 66 may be stored on at least one of one or more computer-readable tangible storage devices 830 shown in FIG. 7, on at least one of one or more portable computer-readable tangible storage devices 936 as shown in FIG. 7, on repository 53 connected to network 50, or downloaded to a data processing system or other device for use. For example, program code and programs such as the accessibility path guidance program 66 may be stored on at least one of one or more tangible storage devices 830 on server computer 54 and downloaded to the device computer 52.

Alternatively, server computer 54 can be a web server, and the program code and programs such as the accessibility path guidance program 66 may be stored on at least one of the one or more tangible storage devices 830 on server computer 54 and accessed on the device computer 52. In other exemplary embodiments, the program code and programs such as the accessibility path guidance program 66 may be stored on at least one of one or more computer-readable tangible storage devices 830 on server computer 54 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIGS. 2A-2B show a flow diagram of a method of providing accessibility path guidance on a touch screen of a device with microfluidics.

In a first step, the device computer loads a display on the touchscreen which requires input (step 102). The display may be of a web page, an application, or any other display of object fields which require input from a user.

The accessibility path guidance program 66 fetches flow information regarding the display (step 104). The flow information may include, but is not limited to, a reusable sequence of steps that can execute in different contexts. For example, referring to FIG. 6, the flow may be: 1) Enter Username 160; 2) Enter Password 161; 3) Click Checkbox 164; and 4) Click Login 162. Alternatively, the flow may be: 1) Click Signup 163. The flow information is preferably encoded as XML files and mapped to each of the pages or screens of the application during development of the application or page. Alternatively, the flow information may be detected and added as meta-data to the mobile application.

An indicator that the display has been loaded is sent to the user (step 106), for example by the accessibility path guidance program 66 initiating a specific pattern or vibration by the device computer or playing a specific audio clip for the user.

The accessibility path guidance program 66 creates at least a physical button using microfluidics at any position in which the user is currently touching (step 108).

The accessibility path guidance program 66 verbalizes the various flows possible to the user (step 110). The accessibility path guidance program 66 receives a user selection of flow (step 112). The selection may be through a user depressing the physical button created in step 108 or by depressing the physical button created in step 108 a number of times based on the choice number indicating the flow path the user wants to select. In another embodiment, the user could verbalize the flow path chosen. The flow path may also be obtained from metadata of the application.

The accessibility path guidance program 66 initiates software based on the selected flow by the user (step 114).

The accessibility path guidance program 66 dynamically creates physical ridges 165, 166, 170 and 171 on the touchscreen connecting touch points 172, 173 and 174 and the position of the user to the next object field requiring input from the user such as username 160, password 161, login 162, check boxes 164, signup 163, etc. These ridges can be traced by touch by the user, leading the user from a current point on the touch screen to another object field through touch (step 116). The ridges may be formed using microfluidics as shown in FIGS. 3A-3C. It should be noted that a ridge, whether connecting object fields or a boundary of an object fields may stay raised until the user performs some action or it is confirmed that the user has moved from a first object field to the next object field.

Figure 6:
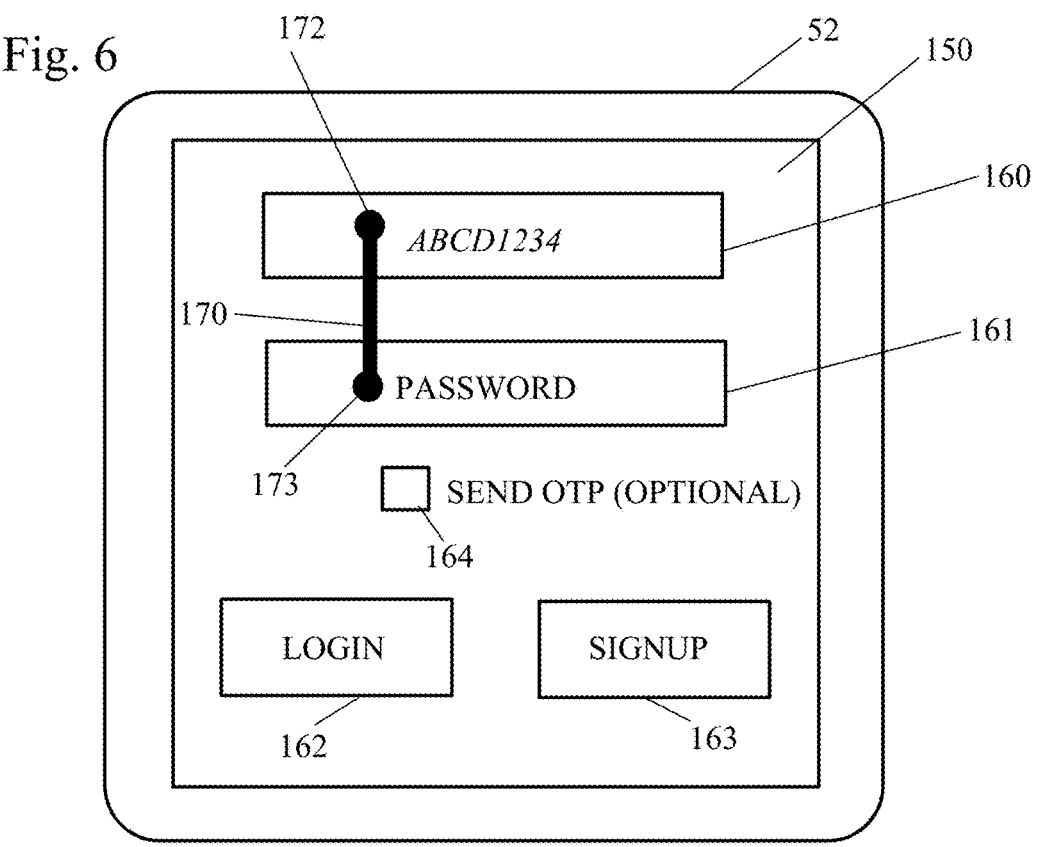
FIG. 6 shows a schematic of a device displaying a ridge for guiding a user from a completed object field to another object field requiring user input.

FIG. 6 shows a device displaying a ridge 170 for guiding a user from a completed object field 160 to another object field 161 requiring user input. After the user has entered in the username in the username object field 160, a raised ridge 170 is formed connecting the username object field 160 to the password object field 161, guiding the user to the next object field.

Figure 4:
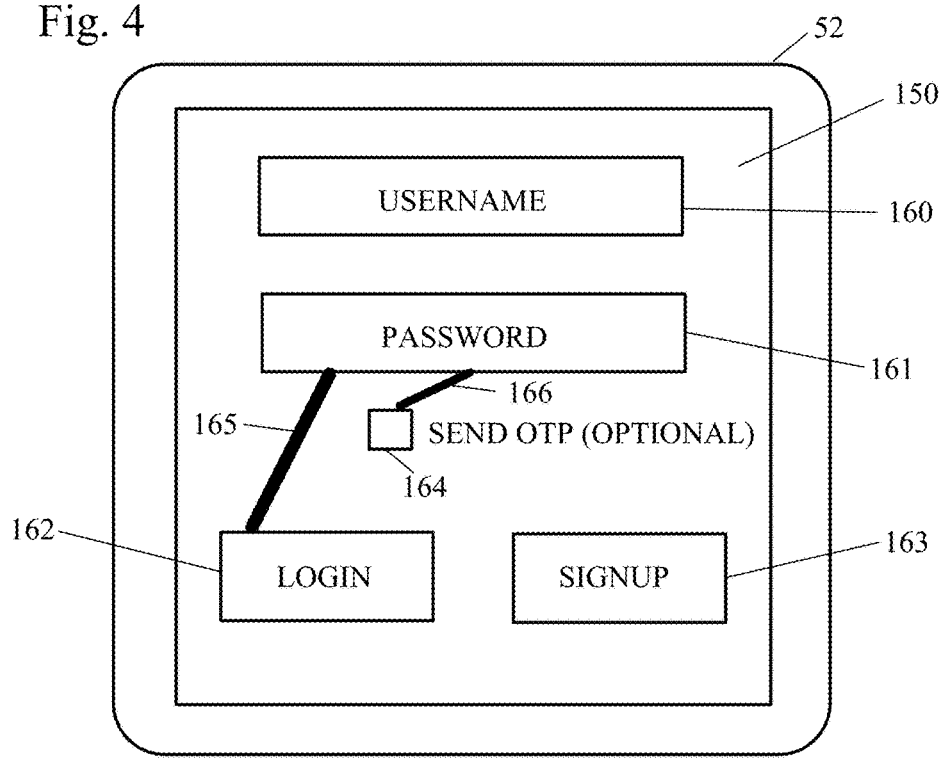
FIG. 4 shows a schematic of a device with ridges of different widths being raised between object fields.

In an alternate embodiment, the ridges may vary in thickness or widths, indicating which fields are optional for user input and which are required. For example, as shown in FIG. 4, a thinner ridge 166 may be used to indicate that the flow from, for example the password object field 161 to optional check box 164, is optional. A thicker ridge 165 may be used to indicate that movement is required to complete the flow from an object field, for example the password object field 161, to another field, for example the login object field 162. The details regarding whether an object field is mandatory or not could be retrieved from UILayout XMLs or accessibility text associated with the object field.

If the user did not reach the next object field (step 118), the ridges are maintained and the method returns to step 118.

If the user has reached the next object field (step 118), the ridges connecting the object fields are removed by the accessibility path guidance program 66 (step 122), for example, by allowing fluid to exit cavity 160 or pocket 157.

The details regarding the input for the object field currently selected by the user are provided to the user (step 124), for example by the accessibility path guidance program 66. For example, the accessibility path guidance program 66 could speak the input required or display the input required in Braille formed by microfluidics.

Alternatively, different types of object fields could have various boundary thicknesses or ridges surrounding the object field through microfluidics. For example, a password object field could have a thick boundary ridge compared to a login object field, allowing the user to recognize the different object field solely by touch.

If all object fields are completed (step 126), the method ends.

If all object fields are not completed (step 126), the method returns to step 116 of dynamically creating physical ridges on the touchscreen connecting touch points and the position of the user to the next object field requiring input from the user in the flow path.

It should be noted that at any time after step 112 of the method, the user may indicate through a gesture or other indication to display the entire flow of object fields requiring input from the user through raised ridges, for example through the accessibility path guidance program 66 or the flow path left to complete. The gesture may also be used to remove the flow path displayed.

Figure 5:
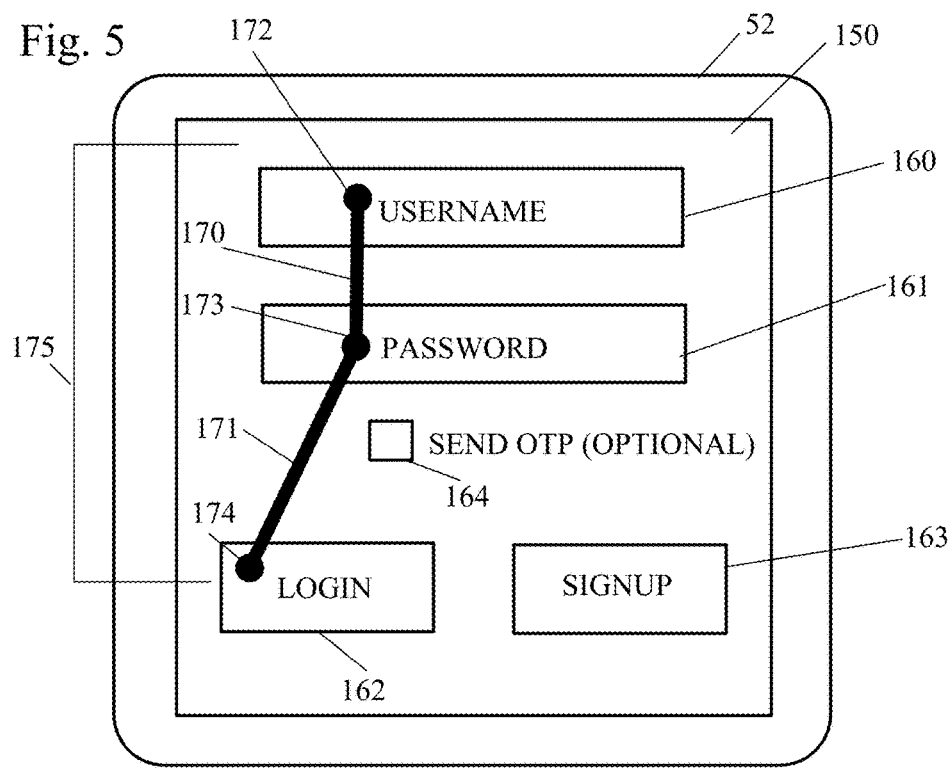
FIG. 5 shows a schematic of a device displaying the entire flow of object fields requiring input from the users through raised ridges.

FIG. 5 shows a schematic of a device displaying the entire flow of object fields requiring input from the user through raised ridges. The username object field 160 is connected to the password object field 161 through a first physical ridge 170 created through microfluidics connected to a first touch 172 point in the username object field 160 and a second touch point 173 in the password object field 161. The password object field 161 is connected to the login object field 162 through a second physical ridge 171 created through microfluidics connected to the second touch point 173 in the password object field 61 and a third touchpoint 174 in the login object field 162.

FIG. 7 illustrates internal and external components of device computer 52 and server computer 54 in which illustrative embodiments may be implemented. In FIG. 7, device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, and accessibility path guidance program 66 are stored on one or more of the computer-readable tangible storage devices 830 for execution by one or more of the processors 820 via one or more of the RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Accessibility path guidance program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Accessibility path guidance program 66 can be downloaded to the device computer 52, and the server computer 54 from an external computer via a network (for example, the Internet, a local area network or other, wide area network) and network adapter or interface 836. From the network adapter or interface 836, accessibility path guidance program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The accessibility path guidance program 66 can be written in various programming languages including low-level, high-level, object-oriented or non object-oriented languages. Alternatively, the functions of an accessibility path guidance program 66 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of providing accessibility path guidance on a display presented on a touch screen of a device with microfluidics, wherein fluid is selectively applied to a portion of the touch screen by a computer of the device to raise a portion of the touch screen, the method comprising the steps of:
   the computer loading a display on the touch screen which requires user input;
   the computer fetching flow information regarding the display;
   the computer detecting that the user has touched the touch screen at a point;
   the computer using microfluidics to create a physical ridge on the touch screen corresponding to a flow path connecting the point on the touch screen in which the user is currently touching to a touch point within an object field which requires user input;
   once the user has reached the object field which requires user input by following the flow path through touch, the computer removing the physical ridge and providing details to the user regarding the input required in the object field; and
   the computer creating a physical ridge on the touch screen through microfluidics connecting a touch point within the object field which required user input to a touch point on the touch screen within another object field which requires user input.

2. The method of claim 1, further comprising the step, after the step of fetching flow information, of the computer alerting the user that at least one flow path exists based on the fetched flow information.

3. The method of claim 2, wherein the step of alerting the user comprises the steps of the computer:
   creating a physical button at a position in which the user is touching the touch screen of the device through microfluidics; and
   verbalizing the at least one flow path to the user.

4. The method of claim 3, further comprising the step of the computer receiving the user's selection of the flow path.

5. The method of claim 4, wherein the step of receiving a user selection of the flow path is by depression of the physical button formed by microfluidics.

6. The method of claim 1, further comprising repeating the steps of creating and removing physical ridges and providing details about object fields, until the user has provided input for all of the object fields required by the flow path.

7. The method of claim 1, wherein after the step of fetching flow information, the method further comprises the step of the computer sending a notification through the device to the user that the display has been loaded on the touch screen.

8. The method of claim 1, wherein the computer provides details regarding the input needed from the user by providing a description in Braille created through microfluidics.

9. The method of claim 1, wherein the computer provides details regarding the input needed from the user by verbalizing a description of the input required to the user.

10. The method of claim 1, wherein the physical ridges connecting field objects are of varying widths indicating which fields of the flow path are optional and which are required.

11. The method of claim 1, wherein an entire flow path selected by a user is displayed to the user through raised touchpoints within the object fields connected by ridges created by microfluidics on the touch screen of the device.

12. The method of claim 1, wherein the boundaries of the object fields requiring input have varying thicknesses formed by microfluidics, providing information to the user regarding the input required.

13. The method of claim 1, wherein any object fields on the touch screen may be connected through microfluidics.

14. A computer program product for providing accessibility path guidance on a display presented on a touch screen of a device with microfluidics, wherein fluid is selectively applied to a portion of the touch screen by a computer of the device to raise a portion of the touch screen, the computer comprising at least one processor, one or more memories, one or more computer readable storage media, the computer program product comprising a computer readable storage medium having program instructions embodied therewith, the program instructions executable by the computer to perform a method comprising:
  loading, by the computer, a display on the touch screen which requires user input;
  fetching, by the computer, flow information regarding the display;
  detecting, by the computer, that the user has touched the touch screen at a point;
  using, by the computer, microfluidics to create a physical ridge on the touch screen corresponding to a flow path connecting the point on the touch screen in which the user is currently touching to a touch point within an object field which requires user input;
  once the user has reached the object field which requires user input by following the flow path through touch, removing, by the computer the physical ridge and providing details to the user regarding the input required in the object field; and
  creating, by the computer, a physical ridge on the touch screen through microfluidics connecting a touch point within the object field which required user input to a touch point on the touch screen within another object field which requires user input.

15. The computer program product of claim 14, further comprising program instructions of, after the program instructions of fetching flow information, alerting the user, by the computer, that at least one flow path exists based on the fetched flow information.

16. The computer program product of claim 15, wherein the program instructions of alerting the user, by the computer, comprises the program instructions of:
  creating, by the computer, a physical button at a position in which the user is touching the touch screen of the device through microfluidics; and
  verbalizing, by the computer, the at least one flow path to the user.

17. The computer program product of claim 16, further comprising the program instructions of receiving, by the computer, the user's selection of the flow path.

18. The computer program product of claim 17, wherein the program instructions of receiving a user selection, by the computer, of the flow path is by depression of the physical button formed by microfluidics.

19. The computer program product of claim 14, further comprising repeating the program instructions of creating and removing, by the computer, physical ridges and providing details about object fields, until the user has provided input for all of the object fields required by the flow path.

20. The computer program product of claim 14, wherein after the program instructions of fetching, by the computer, flow information, the computer program product further comprises the program instructions of sending, by the computer, a notification through the device to the user that the display has been loaded on the touch screen.

* * * * *